Dec. 29, 1931.  W. F. HEROLD  1,838,678
CASTER
Filed Jan. 13, 1930
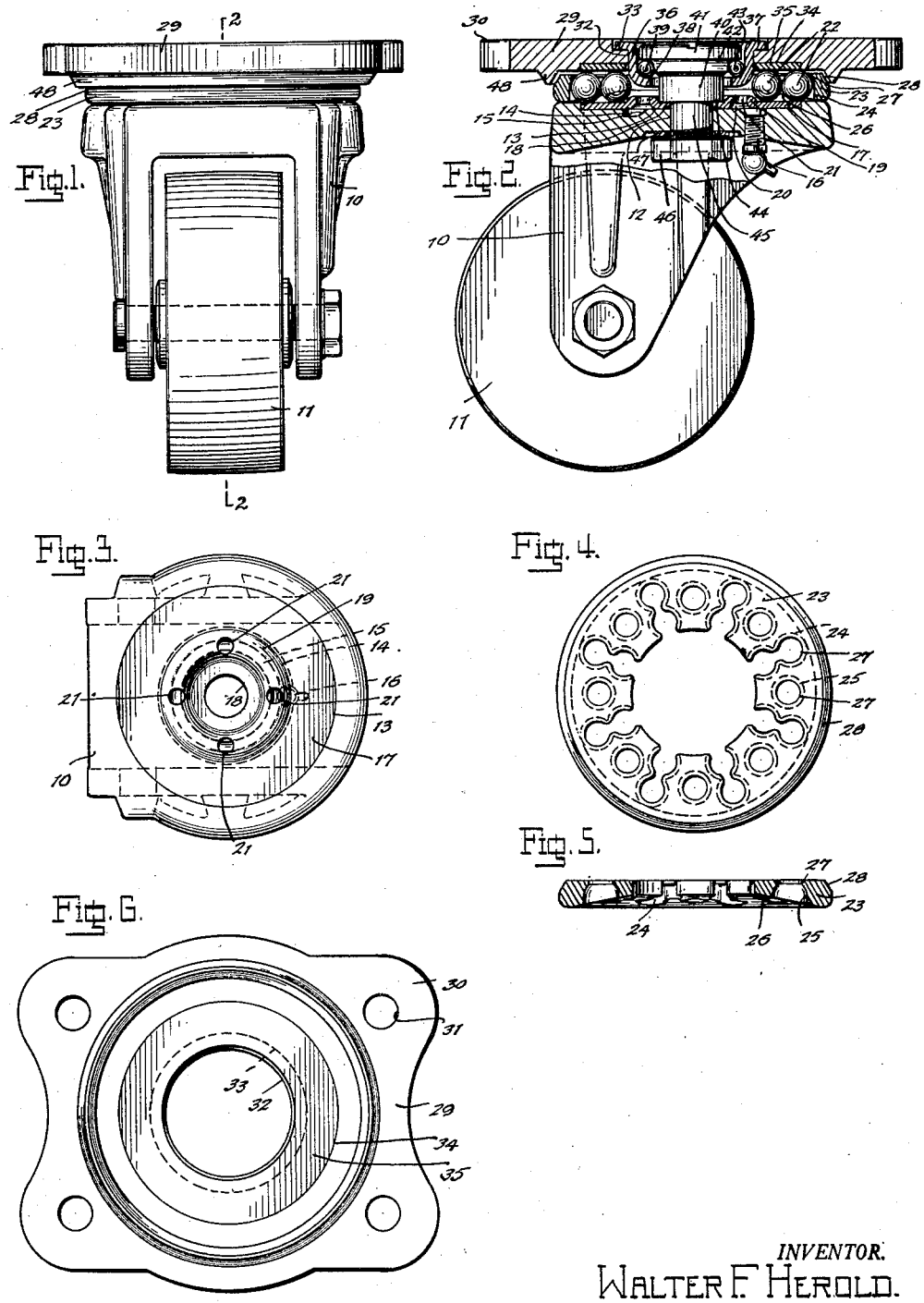
INVENTOR.
WALTER F. HEROLD.
BY
ATTORNEY.

Patented Dec. 29, 1931

1,838,678

UNITED STATES PATENT OFFICE

WALTER F. HEROLD, OF UPPER MONTCLAIR, NEW JERSEY, ASSIGNOR TO THE BASSICK COMPANY, OF BRIDGEPORT, CONNECTICUT, A CORPORATION OF CONNECTICUT

CASTER

Application filed January 13, 1930. Serial No. 420,439.

The present invention relates to casters, particularly heavy duty casters of the type adapted for use with trucks, and for other uses where the caster is subjected to heavy loads and hard usage. An object is to provide a caster in which the load will be supported upon ball bearings distributed over a relatively wide lateral area, and so assembled and arranged that the caster will be relatively low in height, compact, wear resisting and of great strength. Another object is to provide a caster in which auxiliary side thrust ball-bearing means is provided, the load supporting bearings being relieved of side thrust.

A further object is to provide a caster in which the wearing surfaces will have a high degree of finish and accuracy, may be formed of wear-resisting material, and will at the same time be of inexpensive construction and capable of being readily renewed without the expense of renewing the complete caster.

Another object is to provide lubricating means whereby the bearing surfaces may be conveniently supplied with adequate lubrication, and further in which the same will be effectually sealed and protected against dust and dirt.

With the above and other objects in view an embodiment of the invention is shown in the accompanying drawings, and this embodiment will be hereinafter more fully described with reference thereto, and the invention will be finally pointed out in the claims.

In the drawings:

Fig. 1 is a front elevation of a caster according to the present embodiment of the invention.

Fig. 2 is a side elevation with the horn top and attaching plate shown in vertical section along the central vertical plane indicated by the line 2—2 of Fig. 1.

Fig. 3 is a plan view of the horn top, the center stud, bearings, and top plate being removed.

Fig. 4 is a plan view of the ball retainer employed.

Fig. 5 is a sectional view thereof.

Fig. 6 is a plan view of the under side of the top plate.

Similar reference characters indicate corresponding parts throughout the several figures of the drawings.

Referring to the drawings, the caster comprises a horn 10, which may preferably be a malleable iron casting, and in which the wheel 11 is mounted. A center hole 12 is provided in the horn top, and in concentric relation therewith a relatively large diameter flat-surfaced circular recess 13 is provided in the top surface. Intermediate the hole 12 and the outer periphery of the recess there is provided a circular groove 14 having its inner wall 15 beveled, and at one point, preferably at the rearward portion of the horn top, there is provided a lubricant fitting 16, having its upper outlet end directed into said groove 14 and its lower inlet end projecting at the under side of the horn top for convenient engagement of a grease gun.

Within the recess 13 there is fitted a bearing plate 17, preferably formed of hardened steel, its upper surface being flush with the upper surface of the horn, and a hole 18 being provided centrally thereof in register with the hole 12 of the horn top. A circular rib 19 is pressed upwardly in the plate 17 forming a groove 20 at the under side which communicates with the groove 14 of the horn top, and at suitable spaced points there are provided outlet openings 21 through which lubricant can be forced from said groove 14 to the upper side of the plate 17, in order to lubricate the bearings, as will hereinafter more fully appear.

The load supporting balls 22 have bearing on the plate 17, and are positioned in a circular ball retainer ring 23, the balls in the present embodiment being arranged in three rows and in the same lateral plane. For this purpose the retainer ring is provided with a series of spaced radially disposed double ball sockets 24 having their inner ends opening into the center opening of the ring and their outer ends closed, so that lubricant may flow freely to the balls. Single ball sockets 25 are provided between the double ball sockets 24, and in order to provide free access of lubricant to the balls in these, and also to the outer balls of the double ball sockets, the under side of the ring is beveled, as at 26, the outer peripheral portion of the ring resting on the horn top and forming a seal for the lubricant. The ball sockets are flanged inwardly at their upper portions, as at 27, to loosely embrace and position the balls at their upper portions. The outer periphery of the ring is beveled as at 28, for cooperation with the top plate, as will hereinafter more fully appear.

It will be obvious that any suitable arrangement of balls may be employed, other than that disclosed, and that the single ball sockets may be staggered in relation to each other, as well as in relation to the double ball sockets, so that the balls roll on a plurality of spaced paths, thus distributing the load and wear over a greater area.

The top plate 29 is provided with four corner projections 30 having bolt holes 31 for attaching the caster to the truck or other supported object. A relatively large circular center opening 32 is provided having a recessed shoulder 33 extending outwardly therefrom in the upper surface of the plate, while in the under surface a relatively large diameter recess 34 extends outwardly from the center opening. A bearing plate 35, preferably of hardened steel, is fitted in the recess 34 in flush relation to the under surface of the top plate, its outer periphery corresponding in diameter to the outer periphery of the bearing plate 17, while its inner diameter is slightly larger than the opening 32 and corresponds substantially to that of the outer edge of the rib 19 of the said plate 17. The plate 35 forms an upper bearing for the balls 22.

Within the opening 32 there is engaged an apertured cup-bearing member 36 preferably formed of hardened steel, having an outwardly bent flange 37 at its upper end seated in the recessed shoulder 33, and an inwardly bent flange 38 at its lower end projecting below the top plate and forming with the inner surface of said cup member a ball-race portion 39 for the side thrust bearing, presently to be described.

The outer surface of the downwardly projecting portion of the cup member, while not taking the load thrust on the balls 22, serves to position them against lateral displacement.

The caster is assembled by means of a center stud 40, having its head 41 rotatably disposed in the cup member 36 and provided at its under side with a ball-race portion 42, between which and the diagonally opposed ball-race portion 39 of the cup member a series of balls 43 is disposed to form a side thrust bearing.

The stud extends through the opening of the cup member in spaced relation, so as to provide access of the lubricant upwardly through the space to the balls 43, and is provided with a shoulder 44, seated on the bearing plate 17 within the rib 19, and a reduced extension 45 extending downwardly through the openings 18 and 12 of the plate and horn top, and upon the lower threaded projecting end of which a nut 46 and lock washer 47 are engaged against the under surface of the horn top.

Upon the under side of the top plate 29 there is formed a depending circular rib 48, having beveled sides, and which extends in relatively close relation about the beveled surface 28 of the ball retainer ring, acting as a protective closure against the entrance of dirt and dust into the bearings.

The caster, according to the present invention, is of great strength and will be highly resistant to wear under heavy loads and hard usage. The distribution of the bearing surfaces over a relatively wide lateral area minimizes wear and strain upon the parts, and also provides a caster of reduced height and compactness. The bearing may be lubricated with great facility, and a sufficient quantity of lubricant stored within the caster to enable it to run for a relatively long period without attention. The hardened bearing surface elements may be readily renewed after they have become worn, without the necessity for replacing the entire caster structure.

I have illustrated and described a preferred and satisfactory embodiment of the invention, but it will be obvious that changes may be made therein within the spirit and scope thereof, as defined in the appended claims.

Having thus described my invention what I claim and desire to secure by Letters Patent is:—

1. In a caster, a floor engaging element comprising a horn having a transversely disposed horn top and a wheel rotatably supported in said horn, an attaching element disposed above said horn, said horn top and said attaching element having opposed load thrust bearing surfaces, antifriction rotatable bearing means interposed between said bearing surfaces and adapted to take load thrust, a separately formed center stud secured to said horn top having a ball race having a side thrust bearing surface and a downwardly directed bearing surface, a separately formed ball race member carried by said attaching element having a side thrust bearing surface and an upwardly directed bearing surface in opposed relation to said ball race of the center stud, and antifriction rotatable balls interposed between said ball race of the center stud and said ball race member and adapted to take side thrust.

2. In a caster, a floor engaging element comprising a horn having a transversely disposed horn top and a wheel rotatably supported in said horn, an attaching element disposed above said horn and having an opening surrounding the swivel axis of said horn, said horn top and said attaching element having opposed bearing surfaces concentric to and outwardly disposed with respect to said opening, antifriction rotatable bearing means interposed between said bearing surfaces and adapted to take load thrust, a center stud secured to said horn top having a ball race having a side thrust bearing surface and a downwardly directed bearing surface, a removable ball-race member disposed in said opening having a side thrust bearing surface and an upwardly directed bearing surface in opposed relation to said ball race of the center stud, and antifriction rotatable balls interposed between said ball race of the center stud and said ball race member and adapted to take side thrust.

3. In a caster, a floor engaging element comprising a horn having a transversely disposed horn top and a wheel rotatably supported in said horn, an attaching element disposed above said horn, said horn top and said attaching element having opposed bearing surfaces, antifriction rotatable bearing means interposed between said bearing surfaces and adapted to take load thrust, a center stud secured to one of said elements and rotatable with respect to the other elements having a ball race having a side thrust bearing surface and a transversely disposed bearing surface, a separately formed ball-race member carried by the other of said elements having a side thrust bearing surface and a transversely disposed bearing surface in opposed relation to said ball-race of the center stud, and antifriction rotatable bearing means interposed between said ball race of the center stud and said ball race member and adapted to take side thrust.

4. In a caster, a floor engaging element comprising a horn having a transversely disposed horn top and a wheel rotatably supported in said horn, an attaching element disposed above said horn, one of said elements having a removable bearing plate, antifriction rotatable bearing means interposed between said bearing plate and the other of said elements and adapted to take load thrust, a center stud removably secured to said bearing plate carrying element and having means adapted to clamp said bearing plate thereto through securing of said stud to said element, said stud being rotatable with respect to the other element.

5. In a caster, a floor engaging element comprising a horn having a transversely disposed horn top and a wheel rotatably supported in said horn, an attaching element disposed above said horn and having a bearing surface, a removable bearing plate carried by said horn top and providing a bearing surface opposed to said bearing surface of the attaching element, antifriction rotatable bearing means interposed between said bearing surfaces and adapted to take load thrust, a center stud removably secured to said horn top and having a shoulder adapted to clamp said bearing plate thereto through securing of said stud to said horn top, said stud being rotatable with respect to said attaching element.

6. In a caster, a floor engaging element comprising a horn having a transversely disposed horn top and a wheel rotatably supported in said horn, an attaching element disposed above said horn, said horn top and said attaching element having opposed bearing surfaces, antifriction rotatable bearing means interposed between said bearing surfaces and adapted to take load thrust, a retainer for said bearing means closed at its outer periphery and open at its inner periphery, and a center stud secured to one of said elements and rotatable with respect to the other element, said stud being inwardly spaced from the inner periphery of said retainer to provide a lubricant space.

7. In a caster, a floor engaging element comprising a horn having a transversely disposed horn top and a wheel rotatably supported in said horn, an attaching element disposed above said horn, said horn top and said attaching element having opposed bearing surfaces, antifriction rotatable bearing means interposed between said bearing surfaces and adapted to take load thrust, a retainer for said bearing means closed at its outer periphery and open at its inner periphery, a center stud secured to one of said elements and rotatable with respect to the other element, said stud being inwardly spaced from the inner periphery of said retainer to provide a lubricant space, means for admitting lubricant to said space and through said open periphery of said retainer to said bearing means, and antifriction rotatable bearing means interposed between said center stud and said other element and adapted to take side thrust, said stud being spaced inwardly from said other element to provide a lubricant space to admit lubricant from said first mentioned lubricant space to said last mentioned bearing means.

8. In a caster, a floor engaging element comprising a horn having a transversely disposed horn top and a wheel rotatably supported in said horn, an attaching element disposed above said horn, said horn top and said attaching element having opposed bearing surfaces, antifriction rotatable bearing means interposed between said bearing surfaces and adapted to take load thrust, and a center stud secured to one of said elements and rotatable with respect to the other element, said stud being inwardly spaced from said bearing means to provide a lubricant space, one of said elements having an annular chamber having a plurality of spaced circumferentially arranged outlets for admitting lubricant from said chamber to said space, at a plurality of points distributed about said space.

9. In a caster, a floor engaging element comprising a horn having a transversely disposed horn top and a wheel rotatably supported in said horn, an attaching element disposed above said horn and having a bearing surface, a removable bearing plate carried by said horn top and providing a bearing surface opposed to said bearing surface of the attaching element, antifriction rotatable bearing means interposed between said bearing surfaces and adapted to take load thrust, and a center stud secured to one of said elements and rotatable with respect to the other element, said stud being inwardly spaced from said bearing means to provide a lubricant space, said horn top having an annular passage below said bearing plate and said bearing plate having a plurality of spaced outlet openings in communication with said passage for admitting lubricant from said passage to said space.

Signed at Bridgeport, in the county of Fairfield, and State of Connecticut, this 20th day of December, 1929.

WALTER F. HEROLD.